United States Patent Office 3,200,089
Patented Aug. 10, 1965

3,200,089
CROSS-LINKED, RIGID, CELLULAR MATERIALS AND PROCESS FOR THEIR OBTENTION
Yvan Landler, Sceaux, and Pierre Lebel, Rueil-Malmaison, France, assignors, by mesne assignments, to Pneumatiques Caoutchouc Manufacture et Plastiques Kleber Colombes, also known as Kleber Colombes
No Drawing. Filed Nov. 21, 1961, Ser. No. 154,075
Claims priority, application France, Nov. 21, 1960, 844,706
17 Claims. (Cl. 260—2.5)

The present invention has for an object an improvement to the process for obtaining rigid cellular objects in plastic materials, in particular with a polyvinyl chloride basis. It applies mainly to the technique described in U.S. Patent 2,576,749 which claims the obtaining of a rigid cellular plastic material in two stages:

(1) Heating followed by cooling a mould under pressure containing a polyvinyl chloride base mixture and also a diisocyanate (or a polyisocyanate) and a blowing agent which decomposes under the effect of heat during moulding, producing a gas, and forming an embryonic cellular object, and (2) Heating of this object, after removal from the mould, in the presence of water or water vapour, thus increasing the dimensions of the object and, at the same time leading to a hardening of the material.

This technique, described in the above-mentioned patent, enables materials to be obtained having excellent mechanical properties but which nevertheless suffer from the fault that after a certain time they shrink, especially if the object has been exposed to moderately high temperatures.

One of the aims of the present invention is to remedy this fault and to prepare compounds with very good dimensional stability even at high temperatures.

It has been found to a surprising extent that, by using the above mentioned technic but by introducing into the mixture containing polyvinyl chloride, a di- or polyisocyanate and a blowing agent, at least one vinylidenic monomer and an ethylenic anhydride such as maleic anhydride which can copolymerise with this monomer, the cellular objects obtained from this mixture have a dimensional stability which is distinctly superior to that of products obtained according to the techniques used hitherto, especially if these objects are submitted to high temperatures.

According to this invention the cellular products obtained are infusible and insoluble in any solvents and especially in those which dissolve polyvinyl chloride and have good dimensional stability, and show improved mechanical properties. Their good dimensional stabliity shows itself in the following facts: products obtained hitherto, maintained at moderately high temperatures for long periods, for example at 90° C., had a tendency to shrink by up to approximately 60%. Under the same conditions the products obtained according to the invention undergo a shrinkage of approximately 5%.

The infusibility of the cellular products of the present invention is characterised by the following behaviour at high temperatures: if the products obtained by the method described in the above-mentioned U.S. patent are maintained at temperatures of around 150° C. to 160° C., they subside and their cellular structure tends to disappear. On the other hand the products prepared according to the present invention and submitted to the same treatment retain their cellular structure intact.

The products obtained according to the invention are insoluble in solvents; in particular in solvents for polyvinyl chloride, such as dimethylformamide, and in solvents for maleic anhydride-vinylidenic monomer copolymers, such as dimethylformamide and alkaline water. On the other hand, products obtained from mixtures which do not contain the ingredients specifically used in this present invention are soluble in at least one of these solvents.

The different insolubilities are shown in the table below wherein mixture 4 is that used in the present invention.

| Products | Dimethyl-formamide | Alkaline water |
|---|---|---|
| Polyvinyl chloride | Soluble | Insoluble. |
| Copolymer of maleic anhydride and vinylidenic monomer. | do | Soluble. |
| Cellular products obtained from an anhydride and polyisocyanate mixture plus a blowing agent (mixture 1). | do | Insoluble. |
| Cellular products obtained from a mixture of polyvinyl chloride, vinylidenic monomers, polyisocyanate and blowing agent (mixture 2). | do | Do. |
| Cellular products obtained from a mixture of polyvinyl chloride, maleic anhydride, and vinylidenic monomer blowing agent (mixture 3). | do | Do. |
| Cellular products obtained from a mixture of polyvinyl chloride, maleic anhydride, vinylidenic monomer, polyisocyanate and blowing agent (mixture 4). | Insoluble | Do. |

The fact that it is impossible by treating mixture 3 with alkaline water to extract the maleic anhydride-vinylidenic monomer copolymer, indicates that the latter is chemically fixed by a grafting reaction on to the polyvinyl chloride molecules (the copolymer in non-grafted state is soluble in alkaline water as indicated in the table).

Moreover the impossibility of dissolving even small fractions of polyvinyl chloride from mixture 4 (which is a product of reaction between a polyisocyanate and mixture 3), proves that all the polyvinyl chloride has been grafted with the maleic anhydride-vinylidenic monomer copolymer which, after the hydrolysis of the anhydride, leads to the forming of an acid which is also fixed to the polyvinyl chloride and hereafter to the complete cross-linking of the whole product after condensation of the acid formed with the polyisocyanate.

(If the anhydride groups are not grafted onto the polyvinyl chloride, a cellular product resulting from the reaction with polyisocyanate in humid conditions remains soluble in the dimethylformamide as indicated by the behavior of mixture 1.)

The solubility of all products including and up to mixture 3 and the insolubility of mixture 4 can be shown by replacing the dimethylformamide with other solvents for polyvinylchloride such as tetrahydrofuran, cyclohexanone and the like.

The insolubility of products obtained by means of the present invention clearly distinguishes them from those previously known. It may be concluded that these products are reticulated and possess a tridimensional network.

The most probable hypothesis is that the anhydride groups of the copolymer grafted on to the polyvinyl chloride are hydrolysed during the reaction with water vapour and that the acid groups thus formed have reacted with the isocyanate molecules which have not been attacked by water. There are thus bridges of amide groups between the various macromolecules.

As the isocyanate is, according to the present invention, a polyisocyanate comprising two or more —N=C=O groups per molecule, a condensation reaction between these groups and the acid groupings gives rise to a bridging or cross-linking which, by the intermediary of the amide groups formed, links the different grafted polyvinyl chloride molecules.

The structure of the cellular product (mixture 4) thus identified by solubility tests, can be diagrammatically shown as follows:

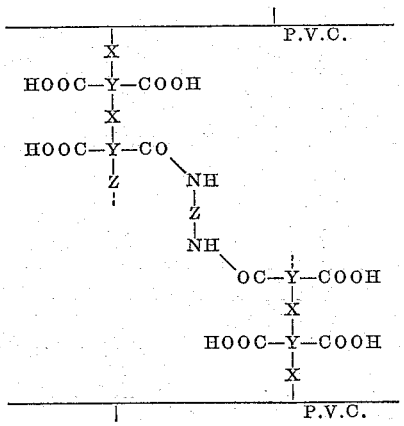

wherein X is a segment of the vinylidenic monomer in the lateral grafted chain,

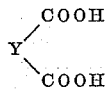

is the segment of the ethylenic anhydride after hydrolysis in the laterally grafted chain, and Z is the carrier grouping o fthe isocyanate functions in the di- or polyisocyanate used.

This cross-linking of the polyvinylchloride based cellular products explains the improvements made to the properties of such products: i.e. their dimensional stability in heat, their infusibility, their insolubility, and their good mechanical properties such as their compressive strength. Moreover it enables the products according to the invention to be clearly distinguished from those obtained by previous methods.

In order to obtain the best advantages of the present invention, the quantities of ingredients to be incorporated into the initial mixture will be specified.

The quantity of polyvinyl chloride to be used depends on the final density it is wished to obtain: it generally ranges between 20 and 95% and preferably between 30 and 70% by weight of the initial mixture.

The isocyanate used is preferably a polyisocyanate such as the p,p′p″-triisocyanate of triphenylmethane (named Desmodur R by Farbenfabriken Bayer of Germany), or else a diisocyanate of diphenylmethane, toluene 2,4-diisocyanate, toluene 2,6-diisocyanate and the like; these isocyanates can also be used in the form of a mixture of two or more of these products. The total amount of polyisocyanate to be used depends on its nature and the result which it is desired to obtain; it generally ranges between 0.5 and 60%, preferably between 5 and 50% by weight of the initial mixture.

The anhydride to be used according to the invention must be an anhydride which is copolymerisable with a vinylidenic monomer, such as acrylic anhydride, citraconic anhydride, itaconic anhydride, maleic anhydride and the like. The amount of this anhydride to be incorporated into the mixture depends upon the final density it is wished to obtain after expansion of the object, and generally ranges between 2 to 30% by weight of the initial mixture.

The vinylidenic monomers used in the present invention are those which polymerize or copolymerize by a radical reaction and which contain at least one $CH_2=C<$ grouping. A mixture of these monomers can also be used. Among the vinylidenic monomers are included open chain compounds with conjugated diene linkages such as butadienic hydrocarbons comprising 1,3-butadiene, isoprene, dimethyl-1,3-butadiene and the like, chloroprene, 3-cyano-1,3-butadiene, piperylene and the like, trienes such as myrcene, the vinylic or vinylidenic compounds such as vinyl chloride, vinylidene chloride, styrene, p-chlorostyrene, 3.5-dichlorostyrene, p-methoxystyrene, esters, nitriles and amides of acrylic and alpha-alkyl acrylic acids such as methyl acrylate, octyl acrylate, methyl methacrylate, lauryl methacrylate, acrylonitrile, alpha chloroacrylonitrile, methacrylonitrile, dimenthylacrylamide and the like, vinyl pyridine, vinyl benzoate, vinylic ketones and esters, vinyl carbazole and the like, ethylene, propylene and the like, isobutylene, divinylbenzene and the like, and compounds containing both the olefinic and acetylenic linkages such as vinyl acetylene, vinyl ethynyl carbinol and the like.

Apart from the monomers characterized by a $CH_2=C$ grouping, the process is also applicable to monomers with a $CF_2=C<$ grouping such as tetrafluoroethylene and the like.

The quantity of vinylidenic monomer used ranges between 2–30% by weight of the initial mixture; in many cases it is advantageous to add approximately the same amount of this or these monomers as of the ethylenic anhydride.

According to the present invention it is also advantageous to incorporate a catalyst ensuring the polymerization or copolymerization of the vinylidenic polymer with the copolymerizable anhydride into the mixture. A large number of products can be used to catalyse such a polymerization they are well known to those skilled in the art and it is superfluous to enumerate them.

The quantity of catalyst used depends on the nature of the catalyst and the quantity of monomer to be polymerized; it generally ranges between 0.1 and 10% by weight of the actual mixture. The blowing agent frequently assures the formation of the "embryonic" cells and is at the same time a polymerization catalyst; it is obvious that in this case it can be used in such a way that it fulfills the two functions simultaneously.

As has been indicated, this invention applies to mixtures with a polyvinyl chloride base. It is clear that vinyl chloride copolymers or mixtures of copolymers and polymers of vinyl chloride and other polymers also come within the scope of the present invention.

The examples given below illustrate the advantage of this invention by comparing the thermal stability and chemical resistance of products obtained to those of cellular products prepared by means of formulae already known. During the preparation of these experiments the different formulae were chosen with a view to obtaining cellular products with the same final density in each example, since the different properties of the objects are influenced by their relative density.

In the examples the thermal behaviour is determined by placing plates of 200 mm. length, 100 mm. width and 40 mm. thickness in a heating chamber at 90° C. and by measuring the variation in volume as a function of the time.

In the examples given below, the volume variation is indicated by the relationship:

$$\frac{\text{Final volume}}{\text{Initial volume}} \times 100$$

after 200 hours' heating at 90° C. According to this formula, the closer this value is to 100, the greater the stability of the product.

In order to compare the mechanical properties of different cellular products at high temperature, the resistance to compression has been determined by measuring the compressive yield strength at 80° C.

Finally the improvements in resistance to solvents have been recorded by measuring the compressive yield strength at 20° C. after a 24 hours' immersion in benzene and styrene at 20° C.

These compressive strengths have been measured according to the standard DIN 53,421 unless otherwise indicated.

EXAMPLES—SERIES NO. 1, EXAMPLES I to XIV

The table given below shows the proportions of the different ingredients used for each example. All proportions are given in percentage by weight. Different ingredients were introduced into an internal mixer of the Werner type and mixed for from 3 to 5 minutes until a homogeneous smooth paste was obtained. This prepared paste was introduced into a mould measuring 20 cm. x 20 cm. x 2 cm., which was hermetically sealed and heated under pressure between the plates of a press. The temperature was brought up to 175° C. and the mould kept at this temperature for 10 minutes.

After this heating the mould was cooled, still under pressure. The "embryonic" cellular object removed from the mould was placed in a humid enclosure heated to 100° C. The object was maintained in its enclosure until a stable volume was obtained but this necessitated a period ranging from 2 to 3 hours approximately.

*Table No. 1*

|  | I | II | III | IV | V | VI | VII | VIII |
|---|---|---|---|---|---|---|---|---|
| Polyvinyl chloride (Breon 121) | 46 | 54 | 43 | 43 | 43 | 42 | 42 | 43 |
| Phthalic anhydride | 19 | | 18 | 18 | 18 | 18 | 18 | 18 |
| Toluene 2,4-diisocyanate | 30 | 30 | 28 | 29 | 27 | 25 | 25 | 27 |
| α,α'-azobis-isobutyronitrile | 5 | 5 | 5 | 5 | 5 | 5 | 5 | 5 |
| Maleic anhydride | | 11 | | | | | | |
| Acrylonitrile | | | 6 | | | | | |
| Styrene | | | | | 5 | | | 4 |
| Vinyl acetate | | | | | 7 | | | |
| Methyl methacrylate | | | | | | 10 | | |
| Ethyl acrylate | | | | | | | 6 | |
| Vinylpyridine | | | | | | | | 5 |
| Butyl methacrylate | | | | | | | | 2 |
| Density in kg./m.³ | 31 | 29 | 30 | 30 | 31 | 29 | 28.8 | 30.7 |
| Stability (at 90° C.): | | | | | | | | |
| $\frac{\text{Final volume}}{\text{Initial volume}} \times 100$ | 30 | 38 | 37 | 37 | 32 | 35 | 32 | 35 |
| Compressive yield strength in kg./cm.² at 20° C | 2.2 | 2.4 | 2.5 | 2.3 | 2.6 | 2.7 | 2.5 | 2.5 |
| Compressive yield strength in kg./cm.² at 80° C | 0.20 | 0.20 | 0.20 | 0.20 | 0.20 | 0.10 | 0.20 | 0.15 |
| Compressive yield strength at 20° C. after immersion for 24 hours in: Benzene / Styrene | Completely broken down and partly dissolved (not measurable) | | | | | | | |

|  | IX | X | XI | XII | XIII | XIV |
|---|---|---|---|---|---|---|
| Polyvinyl chloride (Breon 121) | 51 | 51 | 51 | 50 | 50 | 51 |
| Phthalic anhydride | | | | | | |
| Toluene 2,4-diisocyanate | 28 | 29 | 27 | 25 | 25 | 27 |
| α,α'-azobis-isobutyronitrile | 5 | 5 | 5 | 5 | 5 | 5 |
| Maleic anhydride | 10 | 10 | 10 | 10 | 10 | 10 |
| Acrylonitrile | 6 | | | | | |
| Styrene | | 5 | | | 4 | |
| Vinyl acetate | | | 7 | | | |
| Methyl methacrylate | | | | 10 | | |
| Ethyl acrylate | | | | | 6 | |
| Vinylpyridine | | | | | | 5 |
| Butyl methacrylate | | | | | | 2 |
| Density in kg./m.³ | 30 | 31 | 31 | 30.7 | 32 | 29.4 |
| Stability (at 90° C.): | | | | | | |
| $\frac{\text{Final volume}}{\text{Initial volume}} \times 100$ | 96 | 94 | 93 | 95 | 94 | 95 |
| Compressive yield strength in kg./cm.² at 20° C | 2.8 | 2.7 | 2.6 | 2.6 | 2.3 | 2.4 |
| Compressive yield strength in kg./cm.² at 80° C | 2.3 | 1.7 | 1.9 | 1.6 | 2.2 | 1.45 |
| Compressive yield strength in kg./cm.² after immersion for 24 hours in benzene at 20° C | 2.35 | 2.20 | 2.00 | 2.4 | 1.9 | 1.7 |
| Compressive yield strength in kg./cm.² after immersion for 24 hours in styrene at 20° C | 2.19 | 2.00 | 2.10 | 1.7 | 2.0 | 1.7 |

*Table No. 2*

|  | XV | XVI | XVII | XVIII |
|---|---|---|---|---|
| Polyvinyl chloride (Breon 121) | 47 | 45 | 55 | 53 |
| Phthalic anhydride | 15 | 15 | | |
| Toluene 2,4-diisocyanate | 28 | 28 | 28 | 28 |
| α,α'-azobis isobutyronitrile | 5 | 5 | 5 | 5 |
| Maleic anhydride | | | 7 | 7 |
| Acrylonitrile | 5 | | 5 | |
| Methyl methacrylate | | 7 | | 7 |
| Density in kg./m.³ | 46 | 45.5 | 45 | 44.5 |
| Stability (at 90° C.): | | | | |
| $\frac{\text{Final volume}}{\text{Initial volume}} \times 100$ | 41 | 42 | 98 | 86 |
| Compressive yield strength in kg./cm.² at 20° C | 4.2 | 4.4 | 4.1 | 4.5 |
| Compressive yield strength in kg./cm.² at 80° C | 0.6 | 0.6 | 3.3 | 3.2 |
| Compressive yield strength in kg./cm.² at 20° C. after immersion for 24 hours in benzene | (¹) | (¹) | 3.8 | 3.7 |
| Compressive yield strength in kg./cm.² at 20° C. after immersion for 24 hours in styrene | (¹) | (¹) | 4.0 | 3.6 |

¹ Completely broken down and partly dissolved (not measurable).

TABLE NO. 1—EXAMPLES I TO XIV

In the examples given above, I to VIII do not comprise part of the invention and are given solely in order to show the improvement in stability obtained by using jointly maleic anhydride, a vinylidenic monomer and polyisocyanate as in Examples IX to XIV.

It can be seen that after 200 hours' treatment in a chamber heated to 90° C., all control samples shrank to 30–40% of the initial volume, in contrast to the samples prepared according to the present invention wherein the loss of volume never exceeded 7%.

It should be noted that all the samples were prepared in such a way that they were of a density of approximately 30 kg./m.³.

TABLE NO. 2—EXAMPLES XV TO XVIII

This time, samples with a density of approximately 45 kg./m.³ were prepared.

Examples XV and XVI are not claimed by the present invention and their sole purpose is indicative, showing a shrinkage of around 60% in contrast to Examples XVII and XVIII which come within the scope of this invention, wherein the shrinkage is only 2% after heating at 90° C. for 200 hours.

These examples show that the cross-linked cellular products obtained according to the present invention possess mechanical properties and a resistance to hydrocarbons such as styrene and benzene at a given temperature which have until now not been equalled by products prepared according to prior art.

|  | Example XIX | Example XX |
|---|---|---|
| Polyvinyl chloride | 30 | 70 |
| toluene 2,4-diisocyanate | 25 | 8 |
| α,α'-azobis-isobutyronitrile | 4 | 2 |
| Maleic anhydride | 24 | 12 |
| Methyl methacrylate | 17 | |
| Acrylonitrile | | 8 |

Examples XIX and XX use the mixtures defined above, resulting in cellular products having respectively densities of 38 and 100 kg./m.³, and having excellent properties. These two examples illustrate the wide scope of the present invention.

What we claim is:

1. In a process for preparing rigid cellular products which comprises mixing polyvinylchloride, a polyisocyanate, and a blowing agent which decomposes under the action of heat, heating the resultant mixture in a mold under pressure, cooling the mold under pressure, removing the product thus produced from the mold, and heating the product in the presence of a compound selected from the group consisting of water and water vapor, the improvement which consists in incorporating in said mixture at least one vinylidenic monomer polymerizable by a radical reaction, and an ethylenically unsaturated carboxylic acid anhydride polymerizable with said monomer.

2. A process as defined in claim 1, wherein said mixture contains between 20 and 95% by weight of said polyvinylchloride, between 0.5 and 60% by weight of said polyisocyanate, between 2 and 30% by weight of said at least one vinylidenic monomer, and between 2 and 30% by weight of said anhydride.

3. A process as defined in claim 2, wherein said vinylidenic monomer is selected from the group consisting of acrylonitrile, styrene, methyl methacrylate, vinyl acetate, and vinyl pyridine.

4. A process as defined in claim 2, wherein the anhydride is maleic anhydride.

5. A molding composition for producing a rigid cross-linked polyvinylchloride which consists essentially of polyvinylchloride, a polyisocyanate, a blowing agent which decomposes under the action of heat, at least one vinylidenic monomer polymerizable by a radical reaction and an ethylenically unsaturated carboxylic acid anhydride polymerizable with said monomer.

6. A molding composition as defined in claim 5, wherein said composition contains between 20 and 95% by weight of said polyvinylchloride, between 0.5 and 60% by weight of said polyisocyanate, between 2 and 30% by weight of said at least one vinylidenic monomer, and between 2 and 30% by weight of said anhydride.

7. A molding composition as defined in claim 5, wherein said vinylidenic monomer is selected from the group consisting of acrylonitrile, styrene, methyl methacrylate, vinyl acetate, and vinyl pyridine.

8. A rigid cellular product comprised of polyvinylchloride containing grafted thereon side chains of co-polymers of at least one vinylidenic monomer with an ethylenically-unsaturated carboxylic acid anhydride selected from the group which consists of acrylic anhydride, citraconic anhydride, itaconic anhydride, and maleic anhydride, and cross-linked by a polyisocyanate, said polyvinylchloride being present in the amount of from 20 to 95% by weight, said vinylidenic monomer being present in the amount of from 2 to 30% by weight, said polyisocyanate being present in an amount of from 0.5 to 60% by weight and said anhydride being present in the amount of from 2 to 30% by weight, said cellular product being characterized by dimensional stability at 90° C., by infusibility, by inertness in any organic liquid including polyvinylchloride solvents, and by a compression yield strength which has a value at 80° C. which is at least 60% of its value at 20° C.

9. A rigid cellular product comprised of polyvinylchloride containing grafted thereon side chains of co-polymers of at least one vinylidenic monomer with a maleic anhydride, and cross-linked by a polyisocyanate said polyvinylchloride being present in the amount of from 20 to 95% by weight, said vinylidenic monomer being present in the amount of from 2 to 30% by weight, said polyisocyanate being present in an amount of from 0.5 to 60% by weight and said anhydride being present in the amount of from 2 to 30% by weight, said cellular product being characterized by dimensional stability at 90° C. by infusibility, by inertness in any organic liquid including polyvinylchloride solvents, and by a compression yield strength which has a value at 80° C. which is at least 60% of its value at 20° C.

10. In a process for preparing rigid cellular products which comprises mixing polyvinylchloride, an aromatic polyisocyanate, and a blowing agent which decomposes under the action of heat, heating the resultant mixture in a mold under pressure, cooling the mold under pressure, removing the product thus produced from the mold, and heating the product in the presence of a compound selected from the group consisting of water and water vapor, the improvement which consists in incorporating in said mixture at least one vinylidenic monomer polymerizable by a radical reaction, and an ethylenically-unsaturated carboxylic acid anhydride polymerizable with said monomer.

11. A process as defined in claim 10, wherein said anhydride is selected from the group which consists of acrylic anhydride, citraconic anhydride, itaconic anhydride, and maleic anhydride.

12. A molding composition as defined in claim 5, wherein said aromatic polyisocyanate is a diisocyanate selected from the group consisting of diphenylmethanediisocyanate, 2,4-toluenediisocyanate, 2,6-toluenediisocyanate, and mixtures thereof.

13. A molding composition for producing a rigid cross-linked polyvinylchloride which consists essentially of polyvinylchloride, an aromatic diisocyanate, a blowing agent which decomposes under the action of heat, at least one vinylidenic monomer selected from the group which consists of acrylonitrile, styrene, methylmethacrylate, vinylacetate, vinyl pyridine and an ethylenically-unsaturated carboxylic acid anhydride selected from the group which consists of acrylic anhydride, citraconic anhydride, itaconic anhydride, and maleic anhydride.

14. A molding composition as defined in claim 13, wherein said anhydride is maleic anhydride.

15. A rigid cellular product comprised of polyvinylchloride containing grafted thereon side chains of co-polymers of at least one vinylidenic monomer with an ethylenically-unsaturated carboxylic acid anhydride polymerizable with said monomer, and cross-linked by a polyisocyanate, said polyvinylchloride being present in the amount of from 20 to 95% by weight, said vinylidenic monomer being present in the amount of from 2 to 30% by weight and said anhydride being present in the amount of from 2 to 30% by weight, said cellular product being characterized by dimensional stability at 90° C., by infusibility, by inertness in any organic liquid including polyvinylchloride solvents, and by a compression yield strength which has a value at 80° C. which is at least 60% of its value at 20° C.

16. A rigid cellular product comprised of polyvinylchloride containing grafted thereon side chains of co-polymers of at least one vinylidenic monomer with an ethylenically-unsaturated carboxylic acid anhydride polymerizable with said monomer, and cross-linked by a polyisocyanate which forms with said anhydride at least two amide functions, said polyvinylchloride being present in the amount of from 20 to 95% by weight, said vinylidenic monomer being present in the amount of from 2 to 30% by weight, said polyisocyanate being present in the amount of from 0.5 to 60% by weight, and said anhydride being present in the amount of from 2 to 30% by weight, and said cellular product being characterized by dimensional stability at 90° C., by infusibility, by inertness in any organic liquid including polyvinylchloride solvents, and by a compression yield strength which has a value at 80° C. which is at least 60% of its value at 20° C.

17. A rigid cellular product comprised of polyvinylchloride containing grafted thereon side chains of co-polymers of at least one vinylidenic monomer selected from the group consisting of acrylonitrile, styrene, methyl methacrylate, vinyl acetate, and vinyl pyridine with maleic anhydride, and cross-linked by a polyisocyanate which forms with said anhydride at least two amide functions, said polyvinylchloride being present in the amount of from 20 to 95% by weight, said vinylidenic monomer being present in the amount of from 2 to 30% by weight, said polyisocyanate being present in the amount of from 0.5 to 60% by weight, and said anhydride being present in the amount of from 2 to 30% by weight, and said cellular product being characterized by dimensional stability at 90° C., by infusibility, by inertness in any organic liquid including polyvinylchloride solvents, and by a compression yield strength which has a value at 80° C. which is at least 60% of its value at 20° C.

References Cited by the Examiner

UNITED STATES PATENTS

| | | | |
|---|---|---|---|
| 2,525,880 | 10/50 | Feldman | 260—2.5 |
| 2,529,512 | 11/50 | Ott | 260—2.5 |
| 2,576,749 | 11/51 | Carpentier | 260—2.5 |
| 2,746,940 | 5/56 | Cooper et al. | 260—2.5 |
| 2,837,496 | 6/58 | Vandenberg | 260—45.5 |

MURRAY TILLMAN, *Primary Examiner.*

ROBERT F. WHITE, LEON J. BERCOVITZ, *Examiners.*